United States Patent
Mizuno

(10) Patent No.: US 8,146,081 B2
(45) Date of Patent: Mar. 27, 2012

(54) METHOD OF SELECTING ONE OF EXECUTION SCHEDULES OF GUEST OSES AND VIRTUAL MACHINE MONITOR EMPLOYING THE METHOD

(75) Inventor: Satoshi Mizuno, Hino (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 1130 days.

(21) Appl. No.: 11/962,208

(22) Filed: Dec. 21, 2007

(65) Prior Publication Data

US 2008/0163211 A1 Jul. 3, 2008

(30) Foreign Application Priority Data

Dec. 27, 2006 (JP) ................. 2006-352948

(51) Int. Cl.
*G06F 9/455* (2006.01)
*G06F 9/46* (2006.01)
(52) U.S. Cl. ............ 718/1; 718/100; 718/102; 718/104; 718/107
(58) Field of Classification Search .............. 718/1, 102, 718/104, 107, 100
See application file for complete search history.

(56) References Cited

U.S. PATENT DOCUMENTS

| 7,415,708 | B2 * | 8/2008 | Knauerhase et al. | 718/1 |
| 7,418,705 | B2 * | 8/2008 | Kanai et al. | 718/102 |
| 7,657,890 | B2 * | 2/2010 | Kanai et al. | 718/102 |
| 2006/0075402 | A1 * | 4/2006 | Neiger et al. | 718/1 |
| 2008/0276235 | A1 * | 11/2008 | Knauerhase et al. | 718/1 |

FOREIGN PATENT DOCUMENTS

| JP | 9-114683 | 5/1997 |
| JP | 2006-39763 | 2/2006 |

* cited by examiner

*Primary Examiner* — Emerson Puente
*Assistant Examiner* — Willy W Huaracha
(74) *Attorney, Agent, or Firm* — Finnegan, Henderson, Farabow, Garrett & Dunner, L.L.P.

(57) ABSTRACT

In a virtual machine system, a plurality of guest OSes are time-divisionally executed under virtual machine execution environments provided by a virtual machine monitor (VMM). The VMM specifies a group of guest OSes that intercommunicate with each other via a communication interface provided by the VMM. Then, the VMM sets a quantum in an execution schedule of each guest OS which are included in the plurality of guest OSes and included in the specified group of guest OSes shorter.

7 Claims, 12 Drawing Sheets

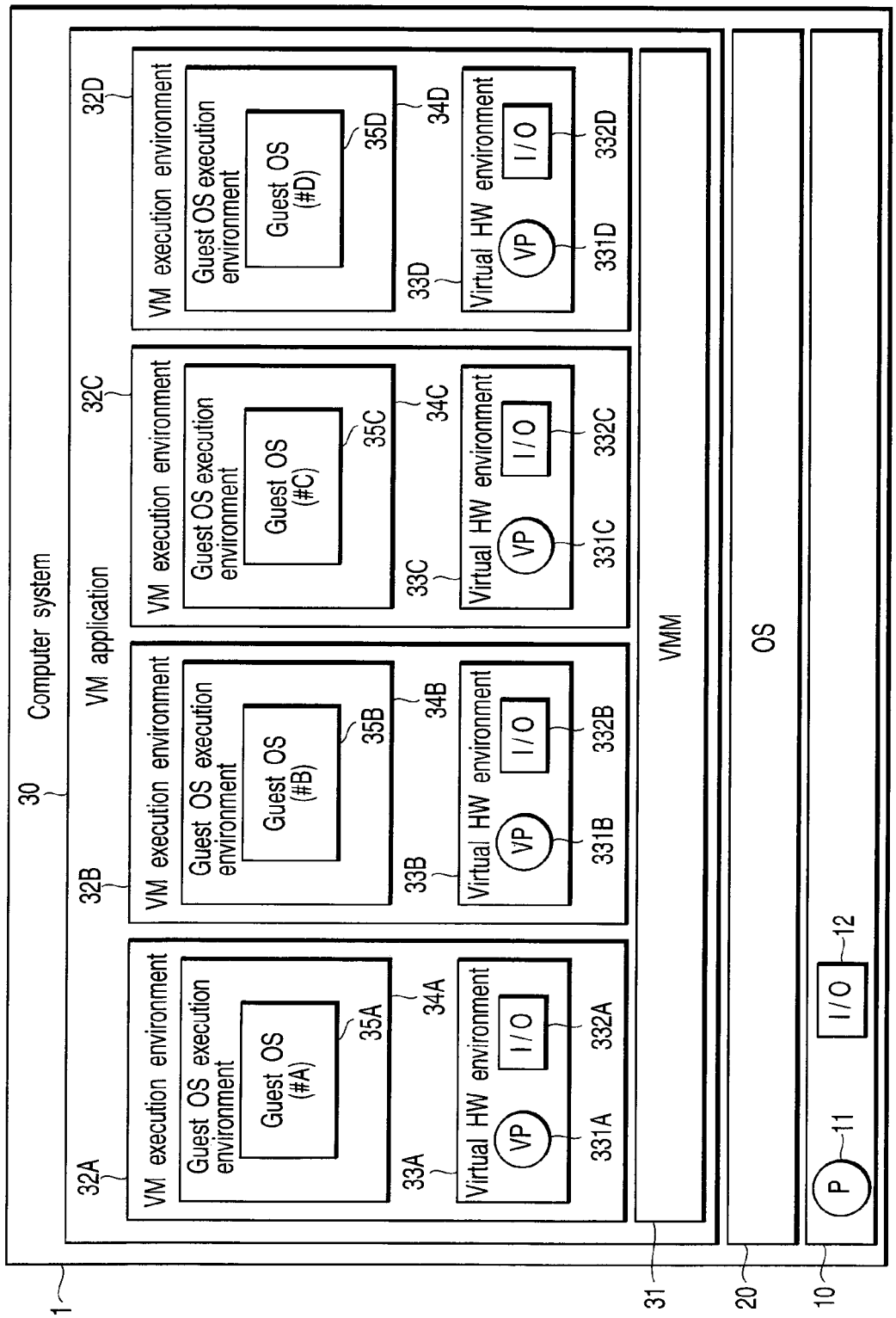
F I G. 1

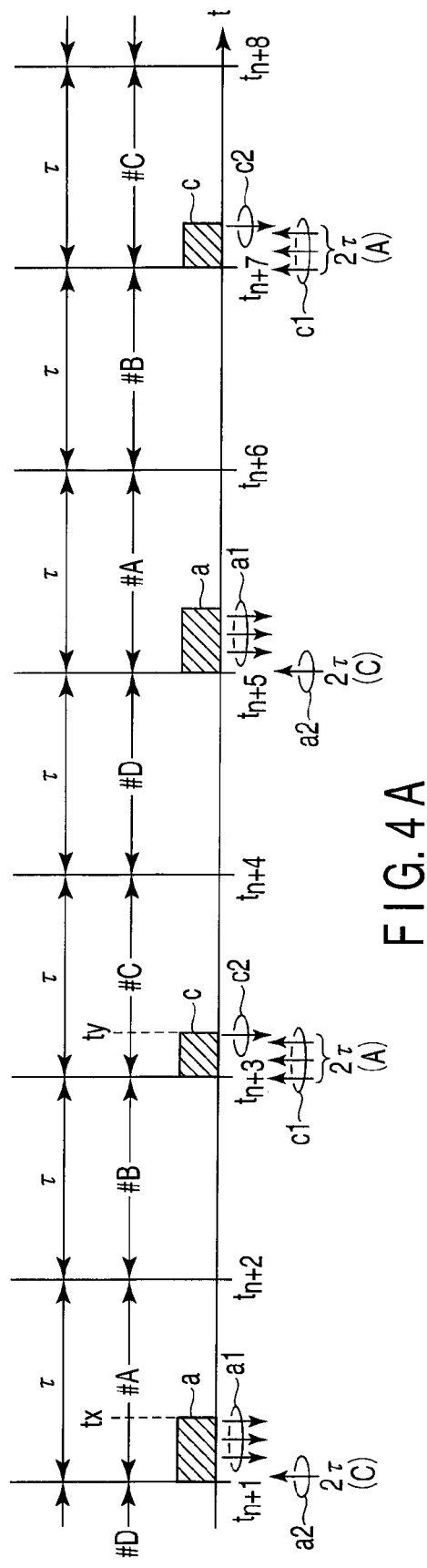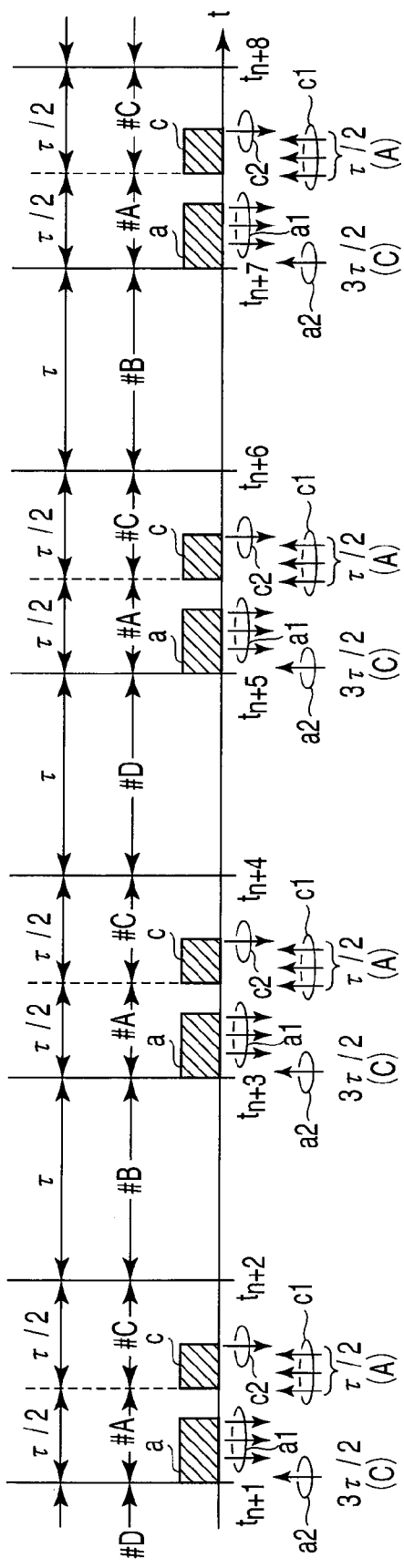
FIG. 4A
FIG. 4B

| Destination of transmission \ Source of transmission | Guest OS #A | Guest OS #B | Guest OS #C | Guest OS #D |
|---|---|---|---|---|
| Guest OS #A |  | 0 ( ) | 3 ($2\tau$) | 0 ( ) |
| Guest OS #B | 0 ( ) |  | 0 ( ) | 0 ( ) |
| Guest OS #C | 1 ($2\tau$) | 0 ( ) |  | 0 ( ) |
| Guest OS #D | 0 ( ) | 0 ( ) | 0 ( ) |  |

Number of messages (Average transmission time)

FIG. 5

| No. | Guest OS#i | Guest OS#j | Group ID |
|---|---|---|---|
| 1 | Guest OS#A | Guest OS#C | 1 |
| 2 | — | — | — |
| 3 | — | — | — |
| 4 | — | — | — |

315

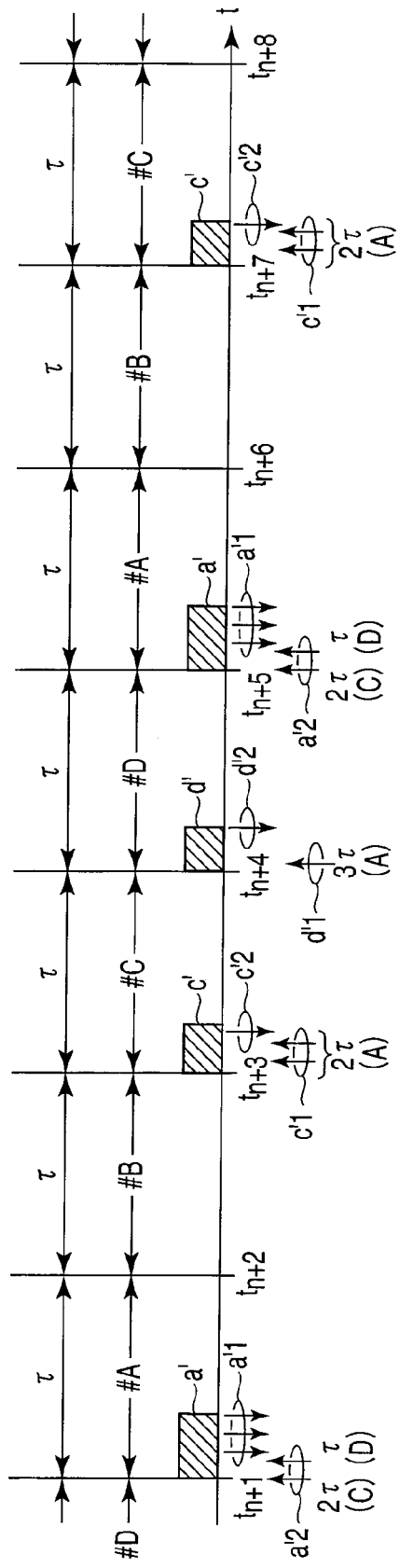
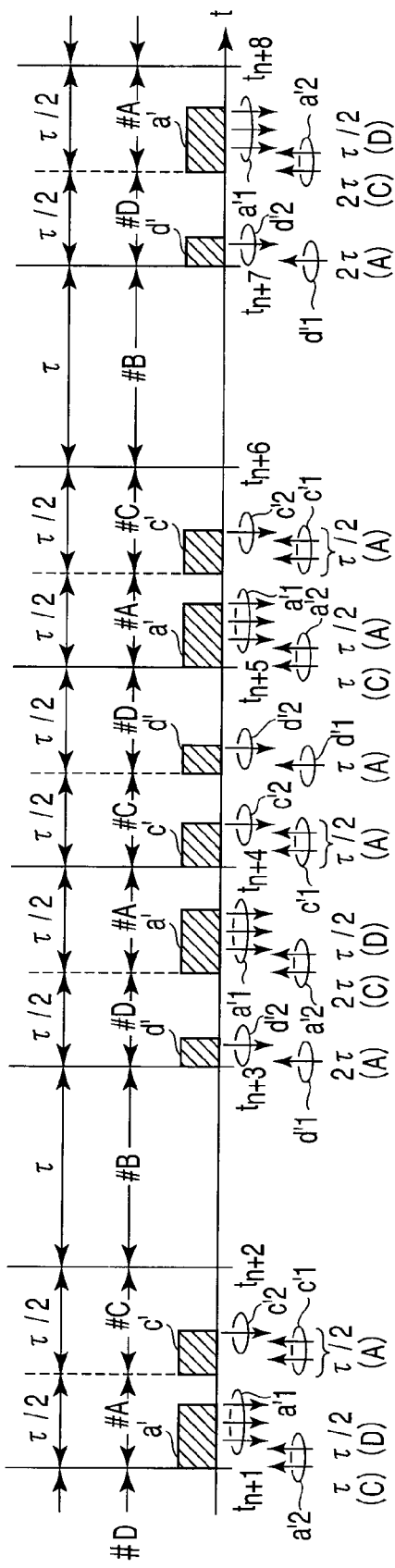
FIG. 8A
FIG. 8B

| Source of transmission \ Destination of transmission | Guest OS #A | Guest OS #B | Guest OS #C | Guest OS #D |
|---|---|---|---|---|
| Guest OS #A |  | 0 ( ) | 2 (2τ) | 1 (3τ) |
| Guest OS #B | 0 ( ) |  | 0 ( ) | 0 ( ) |
| Guest OS #C | 1 (2τ) | 0 ( ) |  | 0 ( ) |
| Guest OS #D | 1 (1τ) | 0 ( ) | 0 ( ) |  |

Number of messages (Average transmission time)

FIG. 9

| No. | Guest OS#i | Guest OS#j | Group ID |
|---|---|---|---|
| 1 | Guest OS#A | Guest OS#C | 1 |
| 2 | Guest OS#A | Guest OS#D | 1 |
| 3 | — | — | — |
| 4 | — | — | — |

| Source of transmission \ Destination of transmission | Guest OS #A | Guest OS #B | Guest OS #C | Guest OS #D |
|---|---|---|---|---|
| Guest OS #A |  | 0 ( ) | 4 ($\tau/2$) | 1 ($2\tau$)<br>1 ($\tau$) |
| Guest OS #B | 0 ( ) |  | 0 ( ) | 0 ( ) |
| Guest OS #C | 1 ($\tau$)<br>1 ($2\tau$) | 0 ( ) |  | 0 ( ) |
| Guest OS #D | 1 ($\tau/2$) | 0 ( ) | 0 ( ) |  |

Number of messages
(Average transmission time)

| Group ID | $d_0$ | $d_1$ | $d_2$ | $d_3$ |
|---|---|---|---|---|
| 1 | $2\tau$ | $0.9\tau$ | — | — |
| 2 | ... | ... | ... | ... |
| ... | ... | ... | ... | ... |

[—] : Not defined : No effective value

FIG. 15

| 316 | $d_0$ | 1 |
|---|---|---|
| | $d_1$ | 2 |
| | $d_2$ | 3 |
| | $d_3$ | 4 |

METHOD OF SELECTING ONE OF EXECUTION SCHEDULES OF GUEST OSES AND VIRTUAL MACHINE MONITOR EMPLOYING THE METHOD

CROSS-REFERENCE TO RELATED APPLICATIONS

This application is based upon and claims the benefit of priority from prior Japanese Patent Application No. 2006-352948, filed Dec. 27, 2006, the entire contents of which are incorporated herein by reference.

BACKGROUND OF THE INVENTION

1. Field of the Invention

The present invention relates to a virtual machine system that provides virtual machine execution environment. More specifically, the invention relates to a method of selecting one of the execution schedules of guest OSes (guest operating systems), which are executed under the virtual machine execution environment, on the basis of communication status between the guest OSes, and a virtual machine monitor employing the same method.

2. Description of the Related Art

Research and development employing the technology of a virtual machine (VM) has recently been conducted even in a computer system such as a personal computer, as disclosed in Jpn. Pat. Appln. KOKAI Publication No. 2006-039763, for example. Commercial application programs for implementing a virtual machine system (VM system) have widely been used. Main frames have already included a VM system using a virtual machine support unit (VM support unit) that is constituted by hardware (HW).

In general, a computer system such as a personal computer comprises HW (real HW) including a processor (real processor), various input/output (I/O) units (real I/O units) and a memory (real memory). In this computer system, an operating system (OS) is executed, and various application programs (applications) are run on the OS. A virtual machine application (VM application) is knows as one of the applications.

A VM application includes a virtual machine monitor (VMM). The VMM is achieved by running the VM application. The VMM is also called a virtual machine manager. The VMM manages a VM system and constitutes a virtual hardware unit (virtual HW unit). The virtual HW unit includes virtual hardware (virtual HW) such as a virtual processor, a virtual I/O unit, a virtual memory unit (virtual memory) and the like. The VMM logically emulates the virtual HW to implement virtual machine execution environments, or execution environments for virtual machine systems (virtual machine system environments). The environments are loaded with OSes that are appropriate as guest OSes, and the OSes (guest OSes) are operated.

The VMM expands the codes (execution codes) of the guest OSes into memory units serving as virtual HWs and executes the execution codes in the form of emulation of virtual processors. An input/output request (I/O request) from the guest OSes is processed when the VMM emulates virtual I/O units.

As described above, the VMM can establish virtual machine execution environments (virtual machine system environments) in a general computer system to execute a plurality of guest OSes therein. The VMM is implemented as one application that is run on an OS (host OS) as described above.

It is also known that a VMM is implemented on the real HW of a computer system. Such a VMM is called a VMM unit and serves as an OS in substance. The VMM unit virtualizes real HW such as a real processor and a real I/O unit, and provides each guest OS with the virtualized HW as a function. The VMM unit establishes virtual machine execution environments thereon. The VMM unit emulates virtual HW such as virtual processors and virtual I/O units or assigns real HW (HW resource) such as a real processor, a real I/O unit and a real memory unit to the virtual HW in terms of time and area. The VMM unit thus establishes virtual machine execution environments. The guest OSes are loaded into the virtual machine execution environments and executed by the virtual processors.

The environment under which a guest OS is executed in a virtual machine execution environment is called a guest OS execution environment. Generally, a plurality of guest OSes are executed in a virtual machine system. A communication interface for performing communications between guest OSes is useful for an execution environment in which each of the guest OSes is executed. The VMM thus provides such a communication interface.

The typical functions of the communication interface are as follows:

(1) Function of interrupt between guest OSes
(2) Function of memory shared between guest OSes
(3) Function of message transfer between guest OSes The function (1) is a mechanism for transmitting an interrupt from a guest OS to another designated guest OS. A receiving guest OS is provided with a means for detecting which guest OS transmits the interrupt by, for example, interrupt factor information.

The function (2) is a mechanism for sharing a memory space between specific guest OSes. A transmitting guest OS writes data to a memory space (shared memory space) and then a receiving guest OS reads the data. Data transfer can thus be performed. For synchronization of data transfer, the above mechanism of the function (1) has only to be used.

To fulfill the function (3), a transmitting guest OS has to designate data to be transmitted (transmission data) and a destination guest OS (receiving guest OS) and require a VMM to transmit the data. The VMM copies the designated data to a reception buffer of the destination guest OS and then sets a reception interrupt to the destination guest OS.

If the functions (1) and (2) are used together or the function (3) is used alone, basic guest OS communications can be achieved.

In a prior art virtual machine system, if the above communication interface is used for a primitive mechanism, a communication protocol such as a transmission control protocol/internet protocol (TCP/IP) can be achieved between guest OSes executed in virtual machine execution environments provided by a VMM. It can thus be considered that a plurality of guest OSes perform communications with each other by the above mechanisms and provide service in cooperation with each other. For example, a guest OS connected directly to an external communication path (external network) serves as a firewall (FW), and another guest OS is connected to the guest OS via a virtual network.

However, when guest OSes execute processing while performing communications with each other, there is a case where the communications do not improve in efficiency. This case will be explained below. Assume first that four guest OSes #A, #B, #C and #D are operated under virtual machine execution environments built by a VMM and the guest OSes #A and #C of the four OSes execute processing while communicating with each other. More specifically, assume that a process #a in the guest OS #A and a process #c in the guest OS #C execute processing while transmitting/receiving data to/from each other.

The VMM supports the above three functions (1) to (3) for performing communications between guest OSes. The guest OSes #A and #C communicate with each other using these functions. Assume here that the processes #a and #c request their respective guest OSes to transmit/receive data via a TPC/IP interface. In this case, each of the guest OSes receives and processes the request and transmits a message to another guest OS via a communication interface provided by the VMM. The communication interface is, for example, a function of transferring a message between guest OSes.

Assume that the following four processings are repeated between the guest OSes #A and #C.

(1) The guest OS #A (process #a) transmits three messages (network packet) to the guest OS #C (processing a1).

(2) The guest OS #C (process #c) receives the three messages from the guest OS #A and processes them (processing c1).

(3) The guest OS #C (process #c) generates a new message from the processed messages and transmits it to the guest OS #A (processing c2).

(4) The guest OS #A (process #a) receives the new message from the guest OS #C and processes it (processing a2).

The operation sequence executed when the above four processings are repeated, is shown in FIG. 4A. In FIG. 4A, a combination of processings a1 and a2 is represented as processing a, and a combination of processings c1 and c2 is represented as processing c. In FIG. 4A, the horizontal axis indicates elapsed time.

In FIG. 4A, "τ" represents the unit of time for assigning a processor (CPU) to each of the guest OSes by the VMM and is generally called a quantum (time quantum). For the sake of brevity, assume that no guest OS is switched halfway through quantum τ in the example of FIG. 4A. More specifically, a processor is assigned to the guest OSes #A, #B, #C and #D during quanta τ starting from tn+1, tn+2, tn+3 and tn+4, respectively. Similarly, the processor is assigned to the guest OSes #A, #B, #C and #D during quanta τ starting from tn+5, tn+6, tn+7 and tn+8, respectively. In actuality, however, a guest OS is switched halfway through quantum τ by an event such as an interrupt.

In FIG. 4A, the downward arrows indicate transmission messages and the upward arrows indicate reception messages. The number of arrows corresponds to the number of messages. The character string including "τ" which is attached to the head of each of the upward arrows (reception messages) means that its corresponding message is transmitted within a time indicated by the character string. The symbol bracketed under the character string including "τ" means that its corresponding message is transmitted from the guest OS indicated by the symbol.

In the example of FIG. 4A, as described above, a processor is dispatched to the guest OS #A at time tn+1 to start the guest OS #A. Then, the process #a of the guest OS #A starts to execute processing a1. Thus, three messages are sent to the guest OS #C. After that (after time tx), the process #a cannot execute processing (processing a2) until at least a message is returned from the guest OS #C. Even though a message is returned form the guest OS #C, if the guest OS #A is not operable, the process #a cannot execute the processing (processing a2) until the guest OS #A becomes operable. If, however, the sum of processing time periods of processings a1 and a2 is smaller than quantum τ, a process other than the process #a of the guest OS #A can be performed within the remaining time period of quantum τ.

The VMM sends a message, which is transmitted by the process #a of the guest OS #A, to the guest OS #C. At this time, however, the guest OS #C has not yet started to operate. In the example of FIG. 4A, it is after time tn+3 that the guest OS #C can start to operate. Hence, the message transmitted to the guest OS #C in the processing a1 is received by the guest OS #C not at once but at time tn+3.

If the time period required for the processings c1 and c2 is shorter than quantum τ, the process #c of the guest OS #C performs the processings c1 and c2 and sends one message to the guest OS #A. After that (after time ty), the processing of the process #c of the guest OS #C cannot be continued, but another process in the guest OS #C is performed. The guest OS #A can be operated again at time tn+5 when 4τ elapses from tn+1 to receive the message from the guest OS #C and process it (processing a2). Thus, a series of processings a1, c1, c2 and a2 is performed within a time period of 4τ. This situation is very inefficient for the processes #a and #c, as is apparent from FIG. 4A.

It can thus be considered that a processor is dispatched to a guest OS, which is subjected to a pending interrupt, by priority. As described above, the communication between guest OSes is achieved as an interrupt in the destination of transmission. Employing this dispatch technique, a processor is dispatched to the destination guest OS when a communication message is transmitted. However, a guest OS is switched each time a message is transmitted. Therefore, overhead costs for switching a guest OS will be greatly increased. In the above-described case where the process #c does not perform the next processing if a plurality of messages are not transmitted, it is likely that the system performance will be degraded as will be described below.

If control is only passed in the first message transmission of the process #a, the process #c cannot complete the processing c1 because the other two messages are not transmitted. In other words, the process #c has to stand by until the guest OS #A is rescheduled to transmit the other (two) messages to the process #c. As a result of switching of guest OSes due to an interrupt, the system performance is likely to be deteriorated according to the circumstances.

It can be considered that quantum τ is set to a smaller value as another technique. The smaller the value, the more the opportunity to execute each of the guest OSes. In this case, a message is transmitted and then a destination guest OS to which the message is transmitted becomes operable in a short time. A message reception process is thus performed early. If, however, quantum τ is decreased, costs for switching a guest OS increase and the efficiency of the entire system decreases.

In general, quantum τ is set to the optimum value such that the response time of a target system is satisfactory and costs for selecting a guest OS are low (the costs do not have an adverse influence on the system). Quantum τ should be set to a small value for the satisfactory response time and it should be set to a large value for the low costs. If, therefore, quantum τ which is originally set to the optimum value is decreased, there is fear that the efficiency of the entire system will be lowered.

BRIEF SUMMARY OF THE INVENTION

According to one embodiment of the present invention, there is provided a method of switching an execution schedule of a plurality of guest OSes in a virtual machine system in which the guest OSes are time-divisionally executed under virtual machine execution environments provided by a virtual machine monitor. In the virtual machine system, any two of the guest OSes executing processing while intercommunicating with each other via a communication interface that is provided by the virtual machine monitor. The method comprises specifying a group of guest OSes which intercommunicate with each other via the communication interface, by the virtual machine monitor; and setting a quantum in an execution schedule of each of the guest OSes included in the specified group of guest OSes shorter by the virtual machine monitor.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a computer system that implements a virtual machine system according to an embodiment of the present invention;

FIGS. 4A and 4B are sequence charts each showing an operation sequence before and after rescheduling in the system status shown in FIG. 3;

FIG. 5 is a table of a communication status in the operation sequence shown in FIG. 4A;

FIGS. 8A and 8B are sequence charts each showing an operation sequence before and after rescheduling when three guest OSes execute processing while communicating with one another;

FIG. 9 is a table of a communication status in the operation sequence shown in FIG. 8A;

FIG. 10 is an example of a guest OS table for a quantum control process performed on the basis of the communication status table shown in FIG. 9;

FIG. 11 is a table of a communication status in the operation sequence shown in FIG. 8B;

FIG. 15 is an example of an average communication time table.

DETAILED DESCRIPTION OF THE INVENTION

An embodiment of the present invention will be described with reference to the accompanying drawings. FIG. 1 is a block diagram showing a configuration of a computer system 1 that implements a virtual machine system (VM system) according to an embodiment of the present invention. The computer system 1 includes hardware (HW) 10 that constitutes a real machine. As is known, the HW 10 includes a real processor 11, an I/O unit (input/output unit) 12 and a memory (not shown). An OS 20 called a host OS runs on the HW 10. Various applications including a virtual machine application (VM application) 30 are executed on the OS (host OS) 20.

The VM application 30 contains a virtual machine monitor (VMM) 31. As the VM application 30 is executed, the VMM 31 is implemented. The VMM 31 manages the VM system and establishes environments (virtual machine execution environments) of the VM system. In FIG. 1, four virtual machine execution environments (VM execution environments) 32A, 32B, 32C and 32D are built.

The VM execution environment 32$i$ (i=A, B, C and D) includes a virtual HW environment (virtual HW unit) 33$i$ and a guest OS execution environment 34$i$. The virtual HW environment 33$i$ includes virtual HW such as a virtual processor (VP) 331$i$, a virtual I/O unit 332$i$, a virtual memory unit (not shown) and the like. The VMM 31 logically emulates the virtual HW to implement the above VM execution environment 32$i$. The VMM 31 loads an OS, which runs in the guest OS execution environment 34$i$ in the VM execution environment 32$i$, into the guest OS execution environment 34$i$ as a guest OS 35$i$ (#i). The guest OS 35$i$ (#i) loaded into the guest OS execution environment 34$i$ is executed in the guest OS execution environment 34$i$.

The VMM 31 expands the codes (execution codes) of the guest OS 35$i$ (#i) in a virtual memory unit included in the virtual HW environment 33$i$ and executes the execution codes in the form of emulation of the virtual processor 331$i$. Thus, the VMM 31 proceeds with the running of the guest OS 35$i$. An I/O request from the guest OS 35$i$ is processed when the VMM 31 emulates the virtual I/O unit 332$i$.

Figure 2:
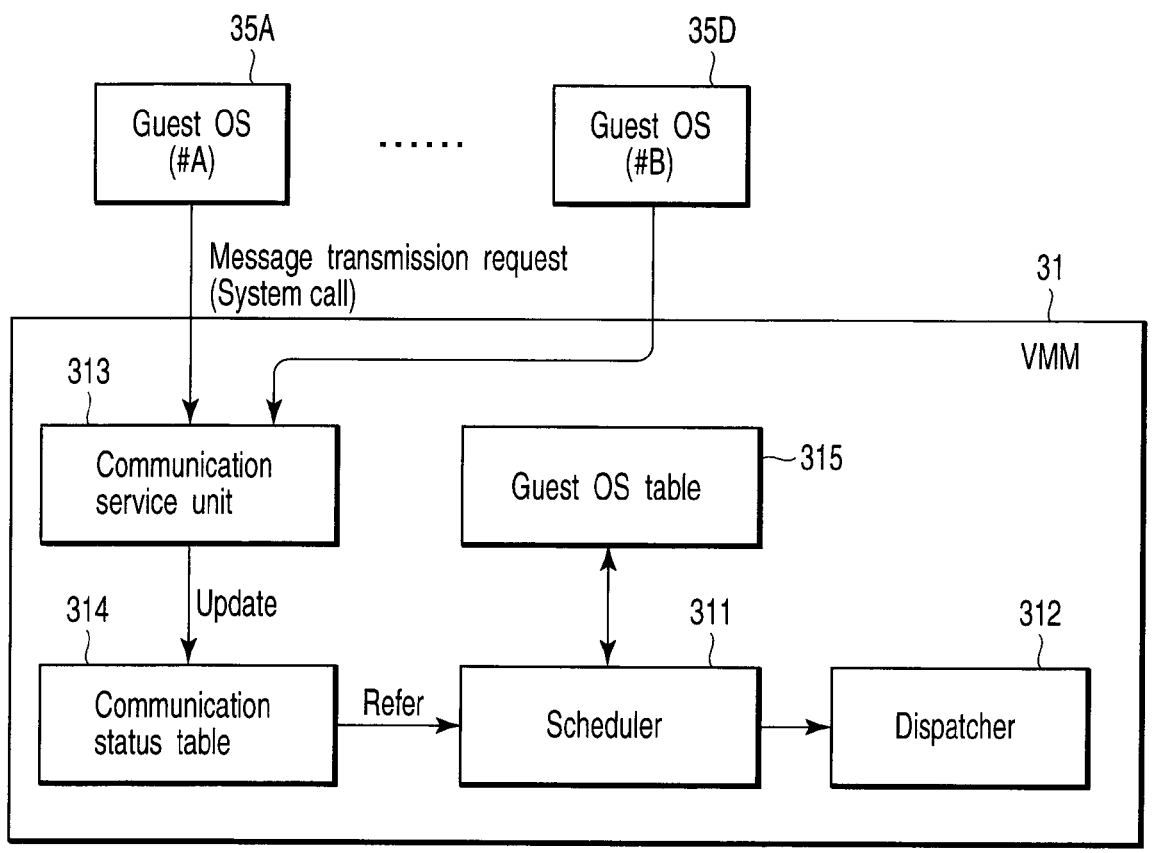
FIG. 2 is a block diagram showing a configuration of a virtual machine monitor (VMM) in the machine system shown in FIG. 1.

FIG. 2 is a block diagram showing a configuration of the VMM 31 shown in FIG. 1. The VMM 31 includes a scheduler 311, a dispatcher 312, a communication service unit 313, a communication status table 314 and a guest OS table 315. The scheduler 311 determines a schedule of the guest OS 35$i$ (#i). Various types can be considered as a scheduling policy implemented by the scheduler 311. Assume in the present embodiment that the scheduler 311 implements a simple round-robin scheduling. Basically, the scheduler 311 instructs the dispatcher 312 to execute the guest OS 35$i$ (#i) in units of time called time quantum ($\tau$). In the present embodiment, however, the scheduler 311 also instructs the dispatcher to change the value of the time quantum according to the circumstances.

The dispatcher 312 actually dispatches a processor (real processor 11) to the guest OS 35$i$ (#1) according to the instruction of the scheduler 311. When a time period of the time quantum indicated by the scheduler 311 elapses, the dispatcher 312 removes the processor (real processor 11) from the guest OS 35$i$ (#1) and assigns the processor to another guest OS. This processing is repeated.

The communication service unit 313 functions as a communication interface for processing a communication request between guest OSes, which is sent from the guest OS 35$i$ (#i) to the VMM 31. The communication request is issued in the form of a hypervisor call (system call) to the VMM 31. In this call, a destination guest OS and message data are designated. The communication service unit 313 sends the designated message to the designated guest OS and sets a reception interrupt. The destination guest OS is notified of the reception interrupt when a processor is dispatched to the destination guest OS. The destination guest OS can refer to the message data sent by the communication service unit 313 as reception data.

The communication status table 314 is used to hold information about the transmission of the message processed by the communication service unit 313. More specifically, the communication status table 314 is used to hold information about message transmission in which a guest OS 35$i$ is defined as a source of transmission and a guest OS 35$j$ (j≠i) is defined as a destination of transmission. Guest OSes 35A, 35B, 35C, 35D, 35$i$ and 35$j$ will be represented below as guest OSes #A, #B, #C, #D, #i and #j, respectively. The guest OS table 315 is used to hold a pair of guest OSes that transmit messages to each other as a pair of intercommunication guest OSes, the messages being received within one schedule time period (described later).

Figure 3:
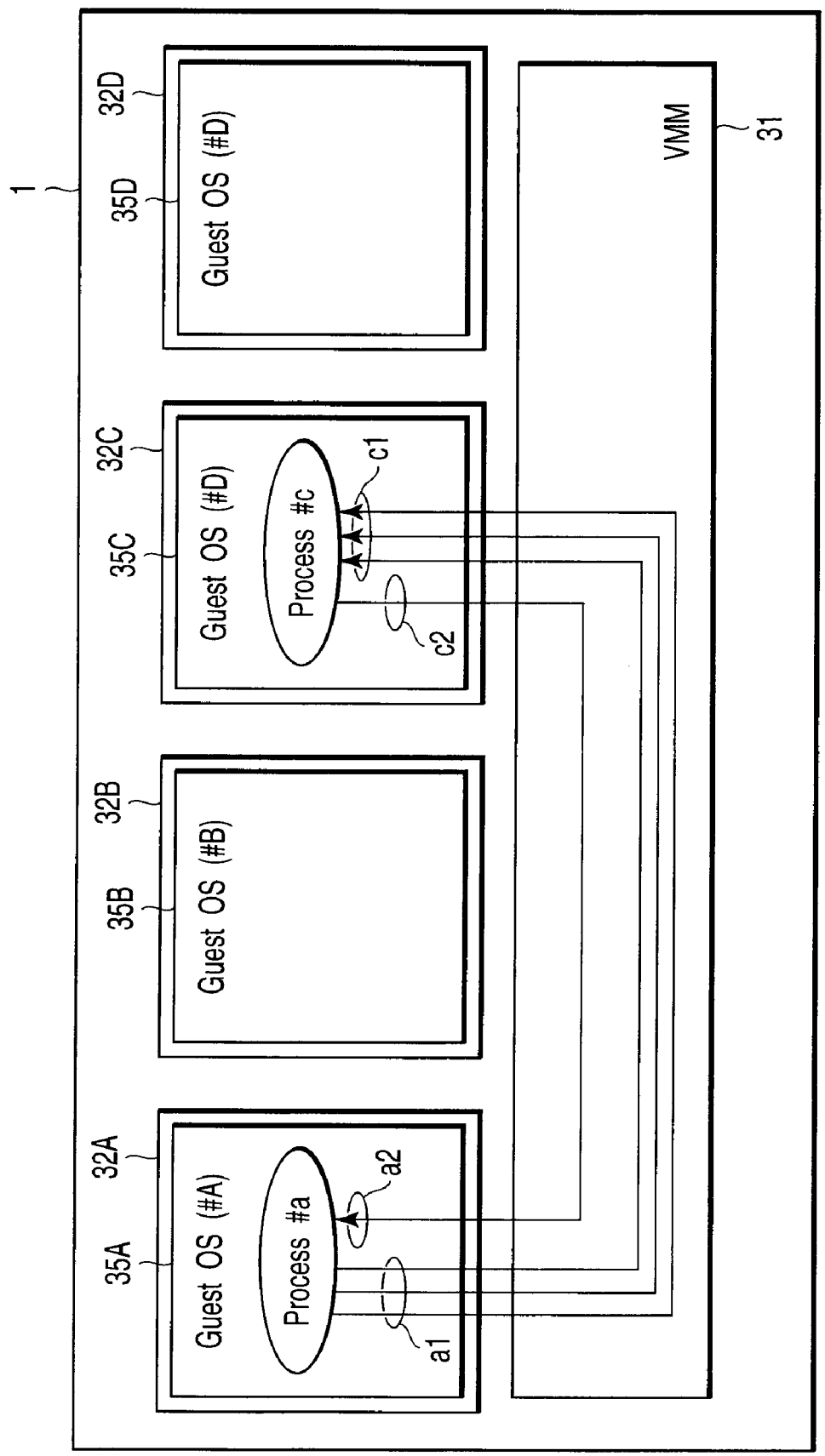
FIG. 3 is a block diagram showing an example of a status of the virtual machine system according to the embodiment, in which two guest OSes execute processing while communicating with each other.

FIG. 3 shows an example of a status of the VM system (virtual machine system) implemented by the computer system 1 shown in FIG. 1. In this example, the guest OSes #A, #B, #C and #D are run by the VM execution environments 32A, 32B, 32C and 32D built by the VMM 31 (see FIG. 1). In the system status shown in FIG. 3, the process #a in the guest OS #A and the process #c in the guest OS #C execute processing while intercommunicating with each other. More specifically, the four processings (a1, c1, c2 and a2) are repeated between the process #a in the guest OS #A and the process #c in the guest OS #C.

FIGS. 4A and 4B each show an operation sequence before and after rescheduling when the four processings are repeated. In FIGS. 4A and 4B, the downward arrows indicate transmission messages and the upward arrows indicate reception messages. The number of arrows corresponds to the number of messages. The character string including "τ" which is attached to the head of each of the upward arrows (reception messages) means that its corresponding message is transmitted within a time (e.g., 2τ corresponds to a time period of 2τ) indicated by the character string. The symbol bracketed under the character string means that its corresponding message is transmitted from the guest OS indicated by the symbol (if the bracketed symbol is A, the message is transmitted from the guest OS #A).

FIG. 5 shows an example of the communication status table 314 of FIG. 2, in which the guest OSes to be scheduled are guest OSes #A, #B, #C and #D. The table 314 has an entry #ij that holds information about message transmission (referred to as communication status information hereinafter) with respect to all of the combinations of the gust OS #i (i=A, B, C and D) as a destination of transmission and the guest OS #j (j=A, B, C and D; j≠i) as a source of transmission.

The communication status information held in the entry #ij of the communication status table 314 includes a message number and average transmission time. The message number is the number of messages issued to the guest OS #j from the guest OS #i during one schedule time period, or the number of messages which are transmitted from the guest OS #i and received by the guest OS #j within a time period which is shorter than one schedule time period. The average stransmission time is average time required until the guest OS #j receives a message from the guest OS #i, or average time required for the message transmission from the guest OS #i to the guest OS #j. In the example of FIG. 5, the average transmission time is bracketed.

In the present embodiment, assume that one schedule time period is expressed by:

τ×the number of guest OSes to be currently scheduled. When a simple round-robin scheduling is performed during a time period of quantum τ as in the present embodiment, one schedule time period is equal to a time period required from a dispatch of a processor to each of the guest OSes to the next dispatch thereof. In FIG. 4, for example, a time period from tn+1 to tn+5 corresponds to one schedule time period, i.e., 4τ.

The communication status information in which the guest OS #i is a source of transmission and the guest OS #j is a destination of transmission, is created by the communication service unit 313. The information of entry #ij of the communication status table 314 is updated to the created communication status information. The scheduler 311 can refer to the communication status information updated in the table 314 at the end of each schedule time period.

The communication status table 314 of FIG. 5 shows a status of message transmission (communication status) represented by the operation sequence shown in FIG. 4A. For example, "3 (2τ)" is held in the entry of the table 314, which corresponds to paired transmission-source guest OS #A and transmission-destination guest OS #C, as communication status information about message transmission between the guest OSes #A and #C during the latest one schedule time period. Value "3" indicates the number of messages which are transmitted from the guest OS #A and received by the guest OS #C within a time period that is shorter than the one schedule time period. Bracketed number "2τ" indicates average transmission time required for message transmission from the guest OS #A to the guest OS #C.

In the present embodiment, the scheduler 311 performs the following process (quantum control process) for controlling quantum every schedule time period. The scheduler 311 refers to the communication status table 314 to search for a pair of guest OSes that intercommunicate with each other closely, on the basis of the communication status between the guest OSes. If the scheduler 311 detects a pair of target guest OSes, a delay in message transmission is prevented by lowering the degree of assignment of a processor to each of the guest OSes. The scheduler 311 performs the quantum control process every schedule time period. The quantum control process can be performed every two or more schedule time periods.

A procedure for performing a quantum control process by the scheduler 311 will be described with reference to the flowchart shown in FIG. 6. First, the scheduler 311 detects all pairs of guest OSes that intercommunicate with each other closely (intercommunicating guest OSes) (step S11). To intercommunicate with each other closely is to transmit a message from each of the guest OSes such that the message can be received within one schedule time period. More specifically, the scheduler 311 refers to the communication status table 314 shown in FIG. 5 to search for all pairs of guest OSes #i and #j which transmit messages such that these guest OSes can receive the messages within one schedule time period. More specifically, the guest OSes #i and #j includes a guest OS #i which transmits a message such that the guest OS #j can receive the message within one schedule time period and a guest OS #j which transmits a message such that the guest OS #i can receive the message within the same time period as the one schedule time period.

In the present embodiment, with reference to the number of messages for each combination of guest OSes shown in the communication status table 314, a combination of guest OSes (a pair of guest OSes) in which the number of messages is not zero (non-zero), is detected as a combination of target guest OSes (a pair of intercommunicating guest OSes). A list (list "L") of all of the detected pairs of guest OSes is created. In the communication status table 314 shown in FIG. 5, a list "L" including only the pair of guest OSes #A and #C as elements is created.

The scheduler 311 compares the created list "L" with the guest OS table 315. If the list "L" includes a pair of guest OSes not entered in the table 315, the scheduler 311 enters the pair of guest OSes in the table 315 (step S12).

If there is a pair of guest OSes not included in the list "L" but entered in the guest OS table 315, or if the guest OS table 315 includes an entry in which a pair of guest OSes not shown in the list "L" is entered, the entry (entry information) is deleted from the guest OS table 315 (step S13). The entry (entry information) deleted in step S13 is an entry (entry information) in which a pair of guest OSes that have intercommunicated with each other before and do not currently communicate with each other is entered.

Figures 6, 7:
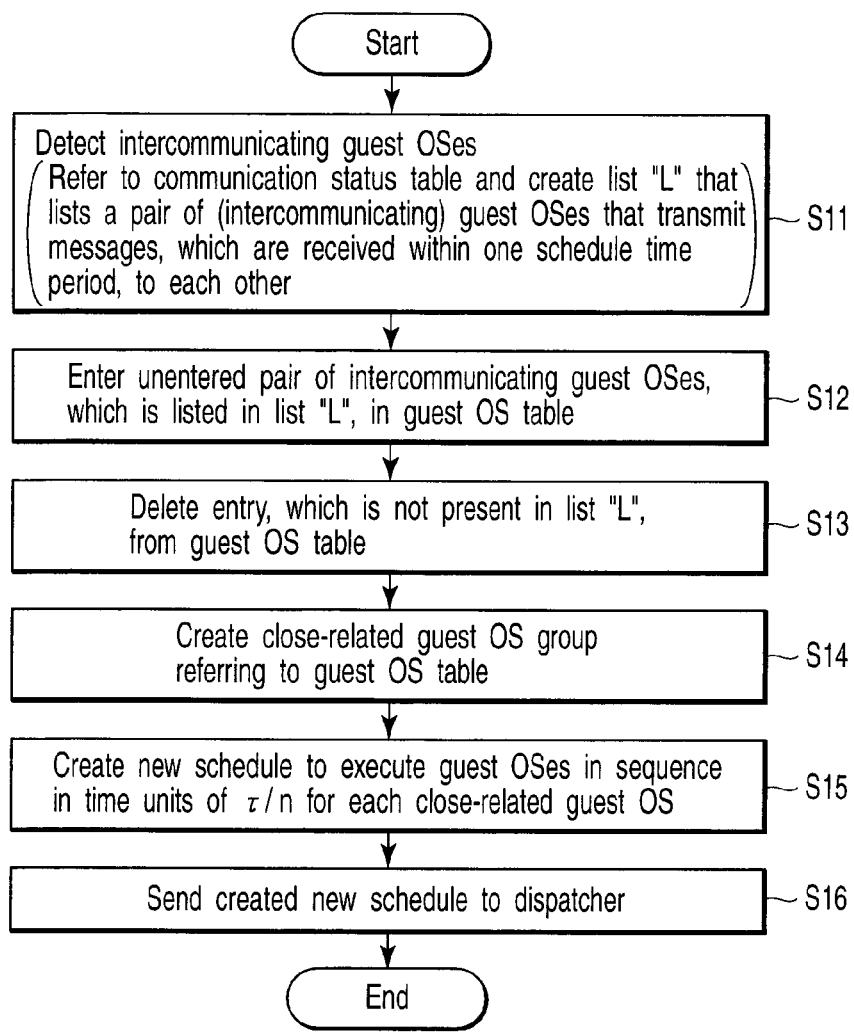
FIG. 6 is a flowchart showing a procedure for a quantum control process in the virtual machine system according to the embodiment of the present invention.
FIG. 7 is an example of a guest OS table.

FIG. 7 shows an example of the guest OS table 315 obtained after steps S12 and S13 are executed. In this example, a pair of guest OSes #A and #C is entered in the first entry of the guest OS table 315 as a pair of intercommunicating guest OSes (#i and #j).

Referring then to the guest OS table 315, the scheduler 311 creates a close-related guest OS group (step S14). The close-related guest OS group is a set (group) of guest OS pairs entered in the guest OS table 315. This set (group) includes not only a pair of guest OSes but also another guest OS which intercommunicates with one of the pair of guest OSes. Therefore, each of the entries of the guest OS table 315 includes not only a column for entering a pair of guest OSes but also a column for entering an ID of a group (group ID) to which the guest OSes entered in the former column belong.

In the guest OS table 315 shown in FIG. 7, only the guest OSes #A and #C make a close-related guest OS group. If, however, the communication status table 314 is one as shown in FIG. 9, the guest OSes #A, #C and #D make a close-related guest OS group. The close-related guest OS group is a set of guest OSes that frequently transmit/receive a message to/from each other.

In step S14, the scheduler 311 provides each of the close-related guest OS groups with its unique ID (e.g., number) as a group ID and enters the ID in the group ID column of the guest OS table. The scheduler 311 executes step S14 and then advances to step S15. In step S15, the scheduler 311 divides a time period during which guest OSes belonging to each close-related guest OS group is originally scheduled in units of quantum τ, into time periods of τ/n to reschedule the guest OSes, where n is called a division constant. In the present embodiment, assume that the division constant "n" is a predetermined constant value, i.e., two. However, the division constant "n" can be changed dynamically as will be described below. In step S15, the scheduler 311 creates (determines) a new schedule (a schedule table indicating a new schedule) for executing the guest OSes to be rescheduled, in sequence in time units of τ/n.

Then, the scheduler 311 sends information of the created new schedule (schedule table) to the dispatcher 312 and instructs the dispatcher 312 to perform rescheduling based on the new schedule (step S16). In accordance with the new schedule, the dispatcher 312 actually performs rescheduling to dispatch a processor to the guest OSes #A and #C.

When the guest OSes #A and #C transmit/receive a message to/from each other as in the present embodiment described above, these guest OSes come to belong to the same close-related guest OS group as a result of the quantum control process. Consequently, the assignment of a processor to the guest OSes #A and #C in time units of τ/2 is rescheduled. As a result of the rescheduling, the guest OSes #A and #C belonging to the close-related guest OS group are executed as shown in FIG. 4B. As for the guest OSes #B and #D not belonging to the close-related guest OS group, the assignment of a processor to these guest OSes every schedule time period (=4τ) in time units of τ is still scheduled. In the present embodiment, note that the rescheduling for the guest OSes belonging to the close-related guest OS group does not influence the scheduling for the other guest OSes.

In the example shown in FIG. 4B, the average transmission time of message transmission from the guest OS #A to the guest OS #C and the average transmission time of message transmission from the guest OS #C to the guest OS #A are about 0.5τ and 1.5τ, respectively. The period (average processing period) of a series of four processings a1, c1, c2 and a2 described above is decreased to 2τ as shown in FIG. 4B from 4τ as shown in FIG. 4A.

In the present embodiment, when the guest OSes execute processing in association with each other while intercommunicating with each other, only the quantum for a schedule for executing the guest OSes is shortened. To shorten the quantum can prevent a degradation of performance due to a delay in communication, which has been caused conventionally, without having any influence on the other guest OSes. In particular, a communication between the guest OSes of a VM system is often performed on the basis of a memory, which reduces overhead costs. There is possibility that this communication will be decreased in delay time (latency) much more than a communication of the real network system. In the present embodiment, therefore, the performance of a high-speed communication between guest OSes of a VM system can be more enhanced and so can be the performance of the entire VM system.

In the examples of FIGS. 4A and 4B, any processes other than processes #a and #c to be performed by the guest OSes #A and #C are not taken into consideration. In actuality, there is no guarantee that the result shown in FIG. 4B will always be produced. In the example of FIG. 4A, however, there is no throughput more than shown in FIG. 4A whatever loads the guest OSes #A and #C have. In the present embodiment, a process can efficiently be performed according to the loads of the guest OSes as shown in FIG. 4B.

Another example of improving the efficiency of processing by the rescheduling of the present embodiment will be described with respect to a case where the guest OS #A (process #a thereof), the guest OS #C (process #c thereof) and the guest OS #D (process #d thereof) execute processing while intercommunicating with one another. FIGS. 8A and 8B each show an operation sequence performed before and after rescheduling when the three guest OSes #A, #C and #D execute processing while intercommunicating with one another. Assume in this case that division constant "n" is two.

In the examples of FIGS. 8A and 8B, the following six processings are executed every schedule time period:

(1) The guest OS #A (process #a) sends two of three messages (network packets) to the guest OS #C and sends the other to the guest OS #D (processing a'1);

(2) The guest OS #C (process #c) receives the two messages from the guest OS #A and processes them (processing c'1);

(3) The guest OS #C (process #c) creates a new message from the processed messages and sends the new message to the guest OS #A (processing c'2);

(4) The guest OS #D (process #d) receives the message from the guest OS #A and processes it (processing d'1);

(5) The guest OS #D (process #d) creates a new message from the processed message and send the new message to the guest OS #A (processing d'2); and (6) The guest OS #A (process #a) receives the messages from the guest OSes #C and #D and processes them (processing a'2).

The processings (transmission processings) a'1 and c'2 need to be performed in this order (a'1→c'2) and the processings (transmission processings) a'1 and d'2 need to be performed in this order (a'1→d'2).

FIG. 9 shows an example of the communication status table 314 in the operation sequence shown in FIG. 8A. FIG. 10 shows an example of the guest OS table 315 obtained by performing a quantum control process on the basis of the status of the communication status table 314 shown in FIG. 9. FIG. 8B shows an operation sequence obtained when a processor is dispatched to the guest OSes #A, #C and #D in accordance with a new schedule created on the basis of the guest OS table 315 shown in FIG. 10 (i.e., an operation sequence obtained after rescheduling).

In the example of the guest OS table 315 shown in FIG. 10, the close-related guest OS group includes guest OSes #A, #C and #D. The assignment of a processor to the guest OSes #A, #C and #D in time units of τ/2 is rescheduled. This rescheduling lowers the degree of assignment of a processor to the three guest OSes #A, #C and #D. The operation sequence of the above six processings (a'1, c'1, c'2, d'1, d'2 and a'2) is improved to the status shown in FIG. 8B from that shown in FIG. 8A. As for the guest OS #B not belonging to the close-related guest OS group, the assignment of a processor to the guest OS #B every schedule time period (=4τ) in time units of τ is still scheduled.

The average processing period in FIG. 8A is 4τ and that in FIG. 8B is 2τ, from which it is seen that the average processing period in FIG. 8A is decreased to 2τ from 4τ. FIG. 11 shows an example of the communication status table 314 in the status of FIG. 8B.

[Modification]

It is assumed in the above embodiment that the division constant "n" is a predetermined constant value (n=2). The division constant "n" is a value (parameter) for determining a time unit for the assignment of a processor to a guest OS. In the above embodiment, a processor is assigned in time units of τ×(1/n), or in time units of τ/n. However, the time required for message communication is influenced by the assignment time τ/n. Thus, the division constant "n" has to be set appropriately.

Figures 12, 13:
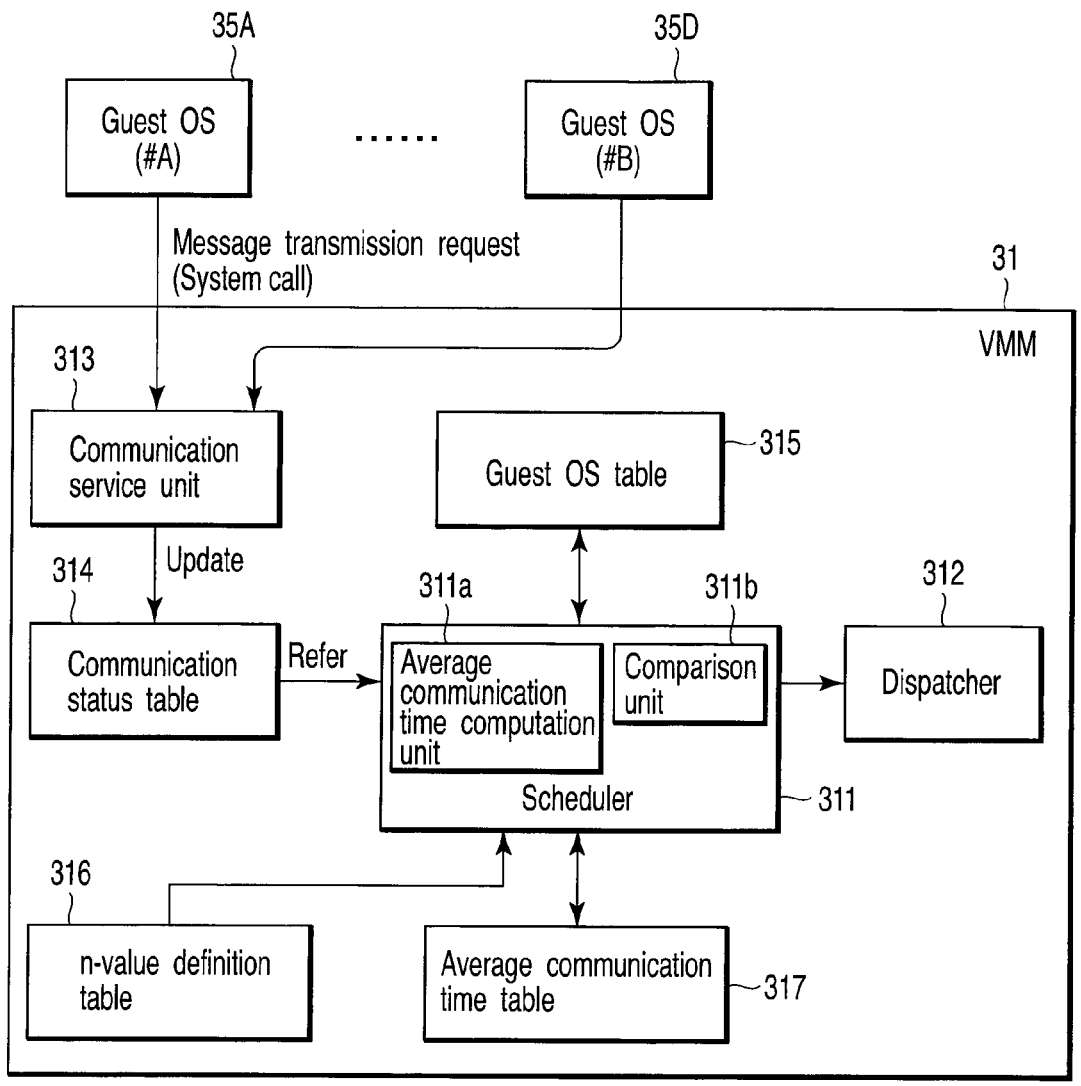
FIG. 12 is a block diagram showing a configuration of a virtual machine monitor (VMM) according to a modification to the embodiment of the present invention.
FIG. 13 is an example of an n-value definition table.

A modification to the above embodiment, in which a quantum control process including a process for appropriately determining a value of the division constant "n" (n-value determination process) is performed by the scheduler 311, will now be described. FIG. 12 is a block diagram showing a configuration of a virtual machine monitor (VMM) 31 according to the modification. In FIG. 12, the same elements as those in FIG. 2 are denoted by the same reference numbers for the sake of convenience. The VMM 31 shown in FIG. 12 differs from the VMM 31 shown in FIG. 2 in that it includes an n-value definition table 316 and an average communication time table 317. Unlike the scheduler 311 shown in FIG. 2, the scheduler 311 in the VMM 31 shown in FIG. 12 includes an average communication time computation unit 311*a* and a comparison unit 311*b*. The units 311*a* and 311*b* and tables 316 and 317 will be described later.

The outline of the quantum control process including an n-value determination process will be described.

(a) The scheduler 311 uses different division constants "n" for close-related OS groups and changes "τ" when necessary. If the division constant "n" of a close-related guest OS group Gi is expressed as $n_i$, the scheduler 311 reschedules the guest OSes belonging to the close-related guest OS group Gi such that a time period for assignment of a process to the guest OSes becomes $τ/n_i$.

(b) Assume that the division constant "n" is predetermined. In this modification, the division constant "n" is set to any one of four values of $d_0, d_1, d_2$ and $d_3$. The specific values of $d_0, d_1, d_2$ and $d_3$ are defined by the n-value definition table 316.

FIG. 13 shows an example of the n-value definition table 316. In the table shown in FIG. 13, $d_0, d_1, d_2$ and $d_3$ correspond to 1, 2, 3 and 4, respectively, which are values (n values) of the division constant "n." If the contents of the n-value definition table 316 are changed, or if the definitions of $d_0, d_1, d_2$ and $d_3$ are changed, various values of the division constant "n" can be defined.

Assume in the modification that the values indicated by $d_0, d_1, d_2$ and $d_3$ increase in the order of $d_0, d_1, d_2$ and $d_3$ (or quantum is divided further). Assume also that $d_0$ (which is the minimum value of the division constant "n") is one. Assume also that the largest division constant "n" defined in the modification is expressed as dmax. In the modification, dmax is $d_3$.

(c) In the quantum control process including an n-value determination process applied to the modification, any determination process is not performed in substance during a period of time from when the value of $n_i$ which is defined by $d_i$ is determined until the quantum control process is called A times. In the modification, the value of $n_i$ is not changed from when it is determined in the n-value determination process until the quantum control process is called A times. Even though the amount of processing is increased because of a frequent change in the value of $n_i$, an increase in overhead costs due to the increase in the amount of processing can be prevented.

In the modification, the scheduler 311 performs a quantum control process every schedule time period as in the above embodiment. More specifically, the scheduler 311 searches a communication status table 314 for a pair of guest OSes which closely intercommunicate with each other (which transmit messages to each other such that they can receive the messages within one schedule time period) on the basis of a communication status between the guest OSes. If the pair of guest OSes is detected, the scheduler 311 prevents a delay in message transmission by lowering the degree of assignment of a processor to the guest OSes. However, the scheduler 311 dynamically changes the value of division constant "n" for each close-related OS group and controls the degree of assignment of a processor for each group. The quantum control process can be performed every two or more schedule time periods.

A procedure for a quantum control process including an n-value determination process will be described with reference to the flowchart shown in FIGS. 14A and 14B. First, the scheduler 311 initializes a variable WAIT_CNT to zero in advance before it repeats the quantum control process. The variable WAIT_CNT is used to control the timing at which the quantum control process is performed. When the quantum control process is called, the scheduler 311 refers to the variable WAIT_CNT to determine whether the variable WAIT_CNT is zero or not (step S21). If the variable WAIT_CNT is not zero, the scheduler 311 decrements the variable WAIT_CNT by one (step S22) and completes the quantum control process.

When the variable WAIT_CNT is zero (step S21), the scheduler 311 controls the degree of assignment of a processor to each close-related OS group as follows. First, the scheduler 311 executes steps S23 to S26 corresponding to steps S11 to S14 of the above embodiment. In other words, the scheduler 311 detects a pair of intercommunicating guest OSes and creates a list "L" of the pair of intercommunicating guest OSes (step S32). The scheduler 311 also enters a pair of intercommunicating guest OSes, which is newly detected and not included in the guest OS table 315, in the table 315 (step S24). Then, the scheduler 311 deletes an entry in which a pair of guest OSes not included in the list "L" is entered, from the guest OS table 315 (step S25) and creates a close-related guest OS group (step S26).

The scheduler 311 executes steps S23 to S26 and then advances to step S27. In step S27, the scheduler 311 adds an entry (entry information) for the newly detected close-related guest OS group to the average communication time table 317. In step S27, the scheduler 311 also deletes from the average communication time table 317 an entry (entry information) for a close-related guest OS group which has already been detected and entered in the table 317 and for a close-related guest OS group which is not detected this time.

FIG. 15 shows an example of the average communication time table 317. The average communication time table 317 includes entries for their respective close-related guest OS groups. The entries of the table 317 are used to enter the measured values of average communication time for the values of division constants "n" defined by $d_0$ to $d_3$ of the close-related guest OS groups. The average communication time will be described later.

In step S27, when an entry (entry information) for the newly detected close-related guest OS group is added to the average communication time table 317, the entry information has already been initialized. Here, the information of average communication time for the values of division constants "n" defined by $d_0$ to $d_3$ represented by the added entry is set to an undefined status having no effective value (the status indicated by symbol "-").

When the scheduler 311 executes step S27, it performs the n-value determination process (steps S28 to S36) as follows. First, the scheduler 311 determines whether the n-value determination process for all the close-related guest OS groups entered in the guest OS table 315 are performed (step S28). If there are close-related guest OS groups that have not performed the n-value determination process (unprocessed close-related guest OS groups), the scheduler 311 selects one from the unprocessed close-related guest OS groups in the guest OS table 315 as a close-related guest OS group Gi (step S29).

The scheduler 311 updates the entry information of the average communication time table 317 corresponding to the selected close-related guest OS group Gi, or it updates the average communication time of the close-related guest OS group Gi (step S30). The average communication time is computed by an average communication time computation unit 311a in the scheduler 311. The average communication time is related to a message received by guest OSes of transmission destination within one schedule time period, the message being included in the messages transmitted from guest OSes belonging to the close-related guest OS group Gi, while the value of division constant "n" defined by $d_k$ (k=0, 1, 2, 3) is used. In other words, the average communication time is an average of time periods (communication time periods) from when messages, which are received by guest OSes of transmission destination within one schedule time period, are transmitted and until they are received. The message received over one schedule time period is excluded from a subject for the computation of average communication time by the average communication time computation unit 311a.

In order to compute the average communication time of the close-related guest OS group Gi, the average communication time computation unit 311a divides the total of communication time periods of messages (Σ: communication time of messages) transferred between guest OSes belonging to the group Gi within the last one schedule period by the total number of messages (N). Specifically, the average communication time of the group Gi is computed by the following formula:

$$(\Sigma: \text{communication time of messages})/N \quad (1)$$

The messages in the formula (1) are messages received by guest OSes of transmission destination within one schedule time period, which are included in the messages transmitted by all of the guest OSes belonging to the close-related guest OS group Gi.

As described above, in the modification, a target time period for computing an average communication time is a last one schedule time period. However, the target time period can be defined as a plurality of schedule time periods. The average communication time period is obtained on the basis of respective average communication time periods of the plurality of schedule time periods.

An example of a method of computing an average communication time by the average communication time computation unit 311a will now be described with reference to the sequence chart shown in FIG. 8A. Referring to FIG. 8A, guest OSes #A, #C and #D make up one close-related guest OS group. Assume here that the group ID of a close-related guest OS group is Gi, i.e., "Gi=G1 (i=1)." Since quantum is τ, "n=1" or "$d_k=d_0$ (k=0). The contents of the communication status table 314 are shown in FIG. 9. In FIG. 8A, the total number of messages (N) is five.

The average communication time of the close-related guest OS group Gi is computed by the average communication time computation unit 311a, as follows:

$$\frac{(\Sigma: \text{communication time of messages})}{N} = \frac{(2 \times 2\tau + 1 \times 3\tau + 1 \times 2\tau + 1 \times \tau)}{5}$$
$$= 2\tau$$

In step S30, the scheduler 311 defines the average communication time computed by the average communication time computation unit 311a as T. In this example, T=2τ. In step S30, the scheduler 311 sets the computed average communication time T (=2τ) in the currently-applied column of "$d_k=d_0$ (k=0)" which is included in the columns of $d_0$ to $d_3$ included in the entry of the average communication time table 317 corresponding to the close-related guest OS group Gi (G1). In other words, the scheduler 311 updates the old set information of the column of "$d_k=d_0$ (k=0)" to the average communication time T (=2τ). The updated average communication time T is relevant to the close-related guest OS group Gi (G1) and "$d_k=d_0$ (k=0)". The updated average communication time T is expressed as $T_{i,k}$, where $T_{i,k}=T_{1,0}$ (i=1, k=0)=2τ.

When the value of the current division constant "n" of the close-related guest OS group Gi (i.e., the value of "$n_i$") is $d_k$, the comparison unit 311b in the scheduler 311 compares the value with the minimum value (1) and determines whether $d_k$ is the minimum value (1), i.e., $d_0$ (k=0) (step S31). If the value $d_k$ of the current division constant "n" (=$n_i$) of the close-related guest OS group Gi is not the minimum value (1), the comparison unit 311b compares the average communication time $T_{i,k}$ (at $d_k$), which is computed this time, with value "0" and determines whether the average communication time $T_{i,k}$ is zero (step S32). If the average communication time $T_{i,k}$ (or the current average communication time $T_{i,k}$) is not zero, the comparison unit 311b compares the average communication time $T_{i,k}$ with the average communication time $T_{i,k-1}$ at $d_{k-1}$ and determines whether $T_{i,k}$ is smaller than $T_{i,k-1}$ (step S33). The average communication time $T_{i,k-1}$ is set in the column of $d_{k-1}$ that is immediately precedent to the currently-applied column $d_k$, which is included in the columns of $d_0$ to $d_3$ included in the entry of the average communication time table 317 corresponding to the close-related guest OS group Gi (group ID=i). In other words, $T_{i,k-1}$ is the last average communication time set in quantum that is one-scale longer than the present time.

If $T_{i,k}$ is smaller than $T_{i,k-1}$, the scheduler 311 sets the value of a new division constant "n" (=$n_i$) to $d_{k+1}$ which is one-scale larger than the current value $d_k$ (step S34). In other words, the scheduler 311 makes the CPU assignment time unit shorter than the current time unit by one scale. If $d_{k+1}$ is not defined or the current value $d_k$ is the maximum value dmax of "n" defined by the n-value definition table 316, the scheduler 311 cannot set a value that is larger than the maximum value dmax. In this case, the scheduler 311 defines a value of a new division constant "n" (=$n_i$) as the current value $d_k$, or dmax. The scheduler 311 executes step S34 and returns to step S28.

If the value $d_k$ of the current division constant "n" (=$n_i$) of the close-related guest OS group Gi is the minimum (1), or if the current value $d_k$ is $d_0$ (k=0) (step S31), the scheduler 311 sets the value of the division constant "n" (=$n_i$) to a value $d_{k+1}$ which is larger than the current value $d_k$ by one scale unless the average communication time $T_{i,k}$ (k=0) is zero (step S34). Since k is equal to zero (k=0) in this modification, the value $d_0$ of the division constant "n" (=$n_i$) is changed from $d_0$ (=1) to $d_1$ (=2).

Assume then that the value $d_k$ of the current division constant "n" (=$n_i$) of the close-related guest OS group Gi is not the minimum (1). Assume also that the average communication time $T_{i,k}$ (at $d_k$) obtained this time is not zero, but the average communication time $T_{i,k}$ is equal to or longer than the average communication time $T_{i,k-1}$ at $d_{k-i}$ (steps S31 to S33). In this case, the scheduler 311 defines a value of a new division constant "n" (=$n_i$) as a value $d_{k-1}$ which is one-scale smaller than the current value $d_k$ (step S36). In other words, the scheduler 311 makes the CPU assignment time unit longer than the current time unit by one scale. The scheduler 311 executes step S36 and then returns to step S28.

Figure 14:
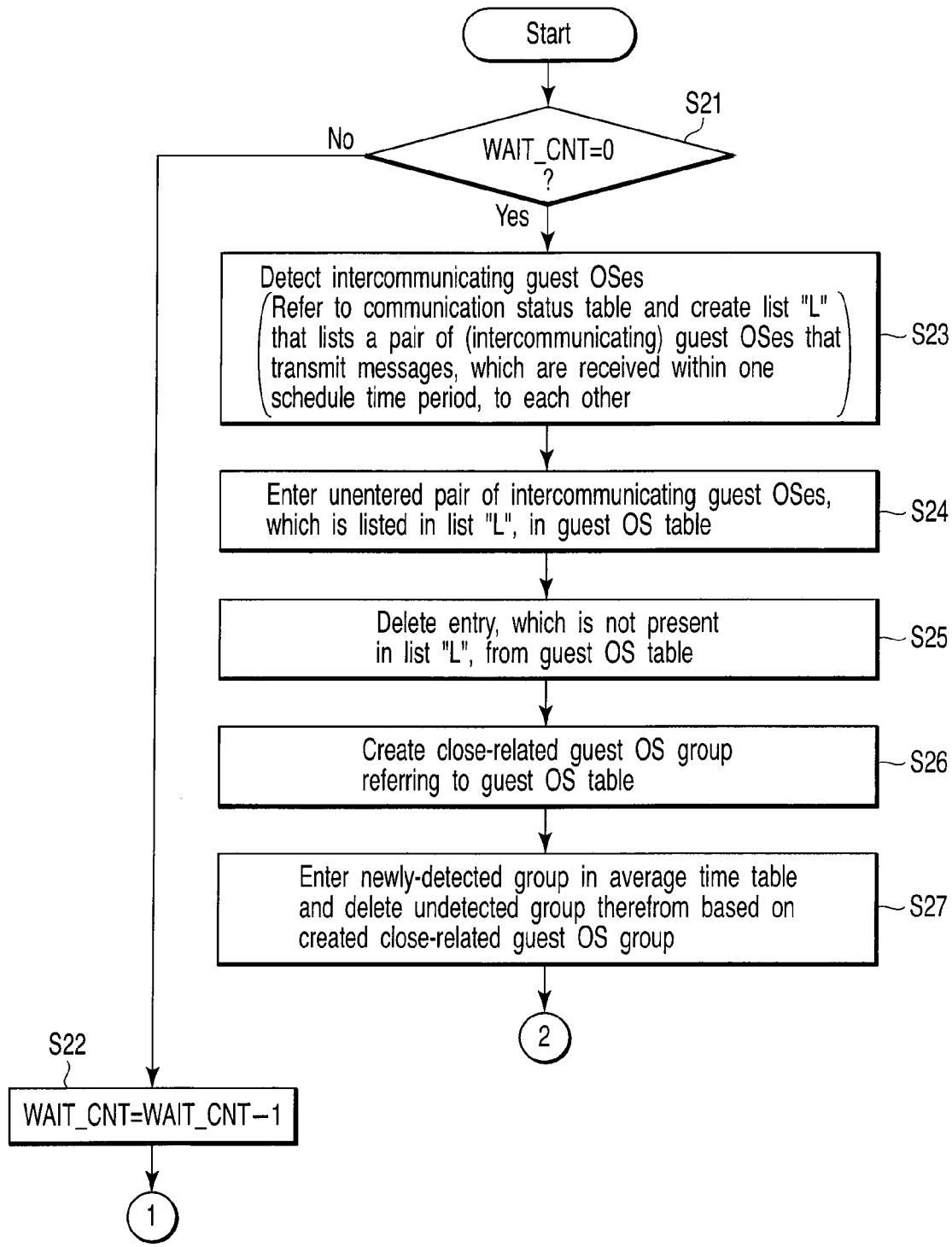
FIGS. 14A and 14B are a flowchart showing a procedure for a quantum control process in the modification to the embodiment of the present invention.
Figure 14B:
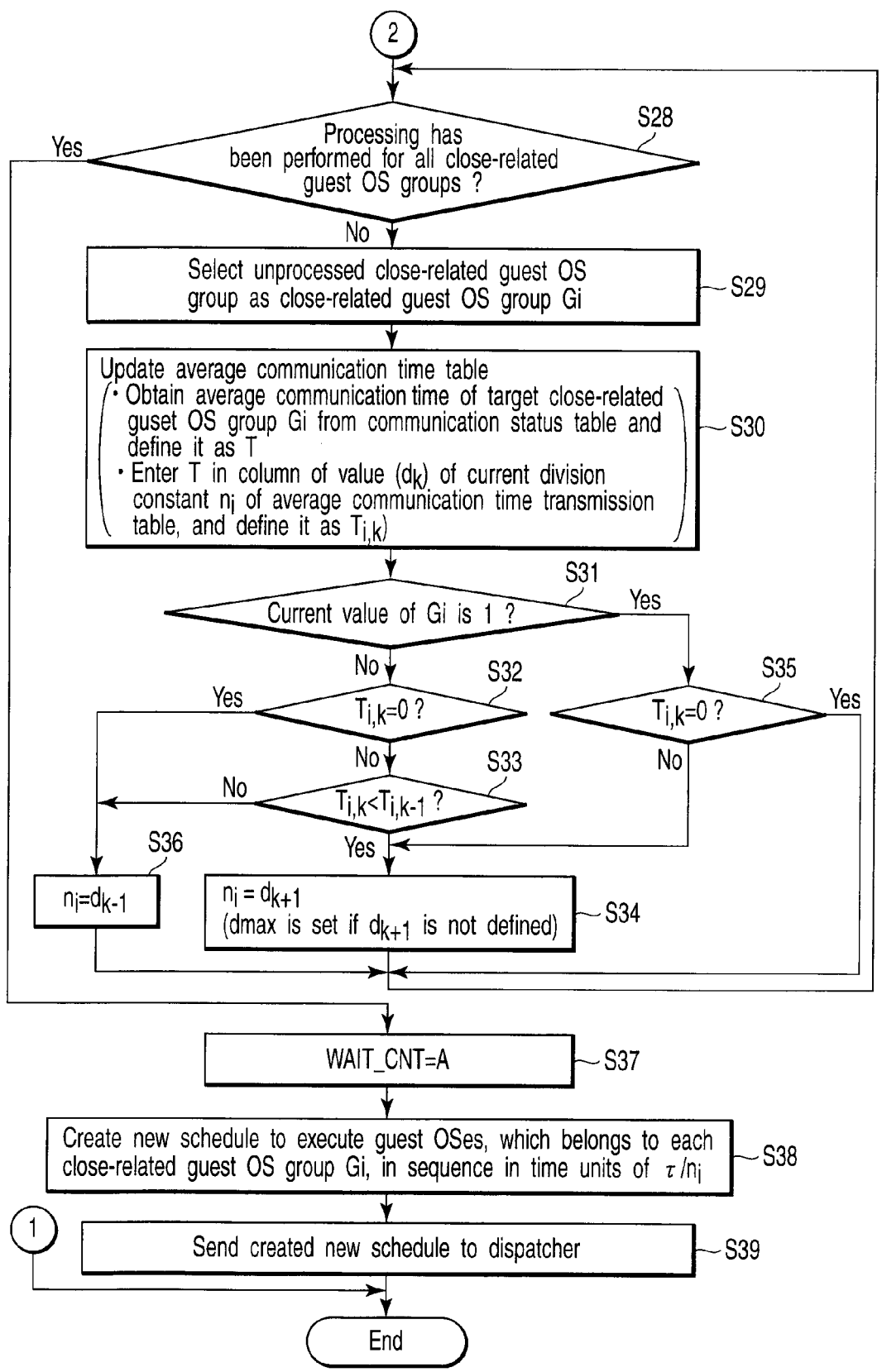

In the flowchart shown in FIGS. 14A and 14B, the case where the average communication time $T_{i,k}$ is zero is also considered (steps S32 and S35). In steps S23 and S24, however, the close-related guest OS group in which $T_{i,k}$ is zero is not entered in the guest OS table 315. In the present modification, there is no close-related guest OS group whose average communication time $T_{i,k}$ is zero. The flowchart shown in FIGS. 14A and 14B includes a process to be performed when $T_{i,k}$ is zero in order to describe a commonly-used procedure. If the value $d_k$ of the current division constant "n" (=$n_i$) of the close-related guest OS group Gi is not the minimum (1) but the average communication time $T_{i,k}$ obtained this time ($d_k$) is zero (steps S31 and S32), the scheduler 311 defines the value of a new division constant "n" (=$n_i$) as a value $d_{k-1}$ which is one-scale smaller than the current value $d_k$ (step S36). If the value $d_k$ of the current division constant "n" (=$n_i$) of the close-related guest OS group Gi is the minimum (1) and the average communication time $T_{i,k}$ obtained this time is zero (steps S31 and S35), the scheduler 311 does not perform an operation of division constant "n" (=$n_i$) but returns to step S28.

The scheduler 311 performs the above process (n-value determination process), which starts from step S28, for all of the close-related guest OS groups. If the scheduler 311 completes performing the n-value determination process for all of the close-related guest OS groups (step S28), it sets an initial value A to the variable WAIT_CNT (step S37).

The scheduler 311 applies the value of $n_i$, which is determined (set) for each of the close-related guest OS groups Gi in the n-value determination process, to the group Gi to create a new schedule for executing the guest OSes belonging to the group Gi in sequence in time units of $\tau/n_i$ (step S38). The scheduler 311 sends information of the new schedule to the dispatcher 312 and instructs the dispatcher 312 to perform rescheduling based on the new schedule (step S39). After that, the variable WAIT_CNT is simply decremented one by one while the process shown in the flowcharts of FIGS. 14A and 14B is called A times (steps S21 and S22). Thus, the guest OSes belonging to the close-related guest OS group Gi are scheduled by the same value of $n_i$.

In the example of FIG. 8A, as a result of the n-value determination process (steps S28 to S36), the value of $n_1$ ($n_i=n_1$) of a close-related guest OS group G1 (Gi=G1) including the guest OSes #A, #C and #D is changed from $d_0$ to $d_1$. In other words, the value of $n_1$ is changed from 1 to 2. Consequently, a new time assignment unit of the close-related guest OS group G1 is changed from $\tau$ to $\tau/2$. Thus, the guest OSes #A, #C and #D are rescheduled in the new time assignment unit as shown in FIG. 8B. In the example of FIG. 8B, the total number N of messages is 10.

As described above, FIG. 9 shows an example of the communication status table 314 in the status shown in FIG. 8B. If the average communication time computation unit 311a computes average communication time for the close-related guest OS group G1 on the basis of the communication status table 314, the average communication time is computed as follows:

$$\frac{(\Sigma: \text{communication time of messages})}{N} = \frac{(4 \times \tau/2 + 1 \times 2\tau + 1 \times \tau + 1 \times \tau + 1 \times 2\tau + 2 \times \tau/2)}{10}$$

$$= 0.9\tau$$

It is seen from the above computation that the average communication time was decreased from $2\tau$ to $0.9\tau$. When a process according to the flowchart shown in FIGS. 14A and 14B is performed next, "$0.9\tau$" is recorded in the column of d1 of an entry corresponding to the close-related guest OS group G1 of the average communication time table 317 as shown in FIG. 15. Then, the value of $n_i$ is changed from $d_1$ (=2) to $d_2$ (=3) and the assignment time unit is more subdivided. The scheduler 311 decreases the value of $n_i$ during which period an advantage can be obtained (i.e., a period during which the new average communication time $T_{i,k}$ in $d_k$ is shorter than the average communication time $T_{i,k-1}$ in $d_{k-1}$). If no advantage is obtained, the scheduler 311 returns the value of $n_i$ from $d_k$ to its immediately preceding value $d_{k-1}$. As a result, the optimum value of $n_i$ is set to each of the close-related guest OS groups.

As was not described above, each of the guest OSes of a close-related guest OS group that is deleted form the average communication time table 317 in step S27 is rescheduled in time units of $\tau$ while the value of the division constant "n" is returned to $d_0$ (=1).

In the above embodiment and its modification, it is assumed that the VMM 31 is implemented as one application (VM application 30) that runs on the OS 20. However, the present invention can be applied to a case where the VMM (virtual machine monitor) is implemented on the real HW of the computer system as a VMM unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of switching an execution schedule of a plurality of guest operating systems (OSes) in a virtual machine system in which the plurality of guest OSes are time-divisionally executed under virtual machine execution environments provided by a virtual machine monitor, any two of the plurality of guest OSes executing processing while intercommunicating with each other via a communication interface that is provided by the virtual machine monitor, the method comprising:

specifying a group of guest OSes which intercommunicate with each other via the communication interface, by the virtual machine monitor;

setting a first quantum in an execution schedule of each of the guest OSes included in the specified group of guest OSes shorter by the virtual machine monitor;

controlling repetition of both the specifying and the setting by the virtual machine monitor, the repetition being performed at predetermined schedule time periods;

computing a first average communication time by the virtual machine monitor each time the group of guest OSes is specified, the first average communication time being a current average communication time required for intercommunications between the guest OSes of the specified group of guest OSes; and comparing the first average communication time with a second average communication time by the virtual machine monitor, the second average communication time being computed when a quantum is set one-scale longer than a second quantum which has been set when the first average communication time is computed, wherein the first quantum is set one-scale shorter than the second quantum if the first average communication time is shorter than the second average communication time, and the first quantum is set one-scale longer than the second quantum if the first average communication time is not shorter than the second average communication time.

2. The method according to claim 1, wherein of said plurality of guest OSes, a set of pairs of guest OSes whose intercommunications are completed within one schedule time period is specified as the specified group of guest OSes.

3. The method according to claim 2, wherein when there is another guest OS which performs intercommunications with one of the guest OSes of each of the pairs of guest OSes and completes the intercommunications within one schedule time period, it is determined that said another guest OS belongs to the specified group of guest OSes.

4. A computer system comprising:

a processor; and a virtual machine monitor that runs on the computer system via execution of instructions by the processor, and establishes virtual machine execution environments under which a plurality of guest operating systems (OSes) are time-divisionally executed, wherein the virtual machine monitor comprises:

a communication interface configured to perform intercommunications between any two of said plurality of guest OSes by request of the plurality of guest OSes;

a communication status table which holds a status of intercommunications performed between the plurality of guest OSes by the communication interface;

a scheduler configured to specify a group of guest OSes that intercommunicate with each other using the communication interface in accordance with the communication status table and create a new schedule in which a first quantum in the execution schedule of each of the guest OSes included in the specified group of guest OSes, is set short; and a dispatcher configured to dispatch the processor to the guest OSes included in the specified group of guest OSes to be executed in accordance with the new schedule;

wherein:

the communication status information held in the communication status table includes a value of average transmission time as well as the number of messages, the average transmission time being an average time required from transmission of the messages to reception thereof;

the scheduler includes an average communication time computation unit and a comparison unit, the average communication time computation unit being configured to compute a first average communication time, which is a current average communication time required for intercommunications between all guest OSes of the specified group of guest OSes, based on the average transmission time in the communication status information held in the communication status table, in accordance with all pairs of guest OSes included in the specified group of guest OSes, each time the group of guest OSes is specified, the comparison unit being configured to compare the first average communication time with a second average communication time computed when a quantum is set one-scale longer than a second quantum which has been set when the first average communication time is computed; and the scheduler sets the first quantum one-scale shorter than the second quantum if the first average communication time is shorter than the second average communication time, and sets the first quantum one-scale longer than the second quantum if the first average communication time is not shorter than the second average communication time.

5. The computer system according to claim 4, wherein the scheduler specifies a set of pairs of guest OSes whose intercommunications are completed within one schedule time period, as the group of guest OSes, the set of pairs of guest OSes being included in said plurality of guest OSes.

6. The computer system according to claim 5, wherein when there is another guest OS which performs intercommunications with one of the guest OSes of each of the pairs of guest OSes and completes the intercommunications within the one schedule period, the scheduler determines that said another guest OS belongs to the specified group of guest OSes.

7. The computer system according to claim 5, wherein:

the communication status table holds communication status information including the number of messages received within a shorter time than the one schedule time period for each pair of guest OSes intercommunicating with each other via the communication interface; and the scheduler refers to the communication status table at predetermined schedule time periods and specifies all pairs of guest OSes corresponding to the communication status information indicating that the number of messages is not zero, as pairs of guest OSes included n the group of guest OSes.

* * * * *